United States Patent [19]

Collier

[11] Patent Number: 5,646,750
[45] Date of Patent: Jul. 8, 1997

[54] METHOD AND APPARATUS FOR COMPRESSING VIDEO IN A MANNER CHARACTERISTIC OF PHOTOGRAPHIC FILM

[75] Inventor: David C. Collier, Gilroy, Calif.

[73] Assignees: Sony Corporation, Tokyo, Japan; Sony Electronics, Inc., Park Ridge, N.J.

[21] Appl. No.: 135,269

[22] Filed: Oct. 12, 1993

Related U.S. Application Data

[63] Continuation-in-part of Ser. No. 710,704, Jun. 5, 1991, Pat. No. 5,255,083.

[51] Int. Cl.$^6$ ................................................. H04N 1/46
[52] U.S. Cl. ...................... 358/518; 358/539; 358/522; 358/523
[58] Field of Search ........................... 358/518, 519, 358/520, 530, 539, 522, 523, 524; 348/439, 384; 382/166

[56] References Cited

U.S. PATENT DOCUMENTS

| | | | |
|---|---|---|---|
| 4,096,523 | 6/1978 | Belmares-Sarabia et al. | 358/80 |
| 4,272,780 | 6/1981 | Belmares-Sarabia et al. | 358/54 |
| 4,410,908 | 10/1983 | Belmares-Sarabia et al. | 358/30 |
| 4,418,358 | 11/1983 | Poetsch et al. | 358/80 |
| 4,642,682 | 2/1987 | Orsburn et al. | 358/80 |
| 4,679,067 | 7/1987 | Belmares-Sarabia et al. | 358/29 |
| 4,694,329 | 9/1987 | Belmares-Sarabia et al. | 358/22 |
| 4,750,050 | 6/1988 | Belmares-Sarabia et al. | 358/311 |
| 4,763,186 | 8/1988 | Belmares-Sarabia et al. | 358/22 |
| 4,782,390 | 11/1988 | Hayashi et al. | 358/76 |

(List continued on next page.)

FOREIGN PATENT DOCUMENTS 0 232 542  11/1985  Japan ........................ G03B 27/73

OTHER PUBLICATIONS

K. Staes, "Masking in the film-telecine system," the BKSTS Journal, Dec. 1977, pp. 354–360.

A.E.S. Green and R.D. McPeters, "New Analytic Expressions of Photographic Characteristic Curves," Applied Optics, vol. 14, No. 2, Feb. 1975, pp. 271–272.

L.J. D'Luna, K.A. Parulski, D.C. Maslyn, M.A. Hadley, T.J. Kenney, R.H. Hibbard, R.M. Guidash, P.P. Lee and C.N. Anagnostopoulos, "A Digital Video Signal Post-Processor For Color Image Sensors," Proceedings of IEEE 1989 Custom Integrated Circuits Conference, pp. 24.2.1–24-2.4.

*Primary Examiner*—Edward L. Coles, Sr.
*Assistant Examiner*—Jerome Grant, II
*Attorney, Agent, or Firm*—Limbach & Limbach L.L.P.

[57] ABSTRACT

A method and system for compressing video in a manner characteristic of photographic film compression. One embodiment of the invention is a video camera including circuitry for compressing the raw video signals generated thereby to introduce film-like compression characteristics thereto. Such video camera preferably includes controls allowing smooth, gradual, film-like compression of video image data recorded thereby, in response to user variation of no more than a small number of compression parameters. In other embodiments, the invention is a video post-production editing system which performs film-like compression on an analog or digital video signal. Such compression can be performed to match the dynamic range of a first, film-derived video segment to that of a second, non-film-derived video segment. Preferably, the invention implements film-like compression digitally, by employing digital circuitry. Typically, such digital circuitry digitizes an analog video signal to be compressed, then transforms the digitized pixels using a look-up table, and finally converts the transformed pixels to an analog compressed video signal. Each color component of a color video signal can be separately digitized, and digital compression can be separately performed on each stream of digitized color component data in accordance with the invention. Other embodiments (for processing a stream of digital video data) need not perform analog-to-digital or digital-to-analog conversion. The invention can alternatively be implemented as an analog circuit for processing an analog video signal.

20 Claims, 8 Drawing Sheets

U.S. PATENT DOCUMENTS

| | | | |
|---|---|---|---|
| 4,811,084 | 3/1989 | Belmares-Sarabia et al. | 358/22 |
| 4,823,184 | 4/1989 | Belmares-Sarabia et al. | 358/27 |
| 4,833,532 | 5/1989 | Abe | 358/519 |
| 4,839,721 | 6/1989 | Abdulwahab | 358/518 |
| 4,862,251 | 8/1989 | Belmares-Sarabia et al. | 358/22 |
| 4,866,511 | 9/1989 | Belmares-Sarabia et al. | 358/27 |
| 4,875,994 | 10/1989 | Belmares-Sarabia et al. | 358/22 |
| 4,907,071 | 3/1990 | Belmares-Sarabia et al. | 358/22 |
| 5,157,506 | 10/1992 | Hannah | 358/518 |
| 5,255,083 | 10/1993 | Capitant et al. | 358/527 |

METHOD AND APPARATUS FOR COMPRESSING VIDEO IN A MANNER CHARACTERISTIC OF PHOTOGRAPHIC FILM

CROSS-REFERENCE TO RELATED APPLICATION

The present application is a continuation-in-part of U.S. patent application Ser. No. 07/710,704, filed Jun. 5, 1991 (to issue as U.S. Pat. No. 5,255,083, on Oct. 19, 1993).

FIELD OF THE INVENTION

The present invention relates to methods and apparatus for processing video signals to introduce film compression characteristics thereto. In one embodiment, the invention is a video camera which includes means for performing photographic film-like compression on video signals produced thereby, to introduce film-like compression characteristics to the video signals.

DESCRIPTION OF THE RELATED ART

Color correction systems for selectively correcting electronic signals representing images are well known in the art. Various forms of color correctors are used in many sophisticated video systems. Sophisticated color correctors are used in film-to-video conversion systems, such as telecines. Particularly in the case of telecines, color correction is needed to overcome color inaccuracies or nonlinearities introduced due to the nature of film and by the electronic scanning of the optical film images to produce the corresponding video signals.

Each pixel of an image has an associated luminosity (and light intensity). In the case of a color image (and color image data), each pixel can be represented by three color component values (e.g., Red, Green, and Blue values), and each color component value of each pixel has a luminosity (and a light intensity) associated with it. The ratio between the largest and smallest luminosity (or light intensity) of the pixels of an image (or quantity of image data) is denoted herein as the "dynamic range" of the image (or image data). Similarly, the ratio between the largest and smallest luminosity (or light intensity) of the color component values of a color component of an image (or a set of color component values) will be denoted herein as the "dynamic range" of the color component (or color component data).

Throughout this specification (including the claims), the term "compression" is used to denote transformation of an image (or image data, or a color component of an image or image data) which reduces the dynamic range thereof. The expression "film compression" (or "film-like compression") is used herein to denote the functional character of the reduction in dynamic range that takes place when an image is generated on photographic film (of the type produced by a photographic film camera) and in a manner which can be achieved by operating a photographic film camera with one or more controls thereof set to desired values, and/or developing exposed photographic film with one or more film developing process parameters set to desired values. For example, electronic data representing an image (e.g., a video stream or a computer stored digital image) can be electronically transformed with a "film-like compression" functional transform which mimics the character of film compression.

Conventional video cameras provide controls ("knee" and "slope") which do not allow for smooth and gradual compression of the video signals generated thereby. In contrast, conventional film cameras with conventional film stocks typically provide controls allowing smooth and gradual compression of the images recorded thereby. Until the present invention, it was not known how to provide a video camera with means for allowing smooth and gradual "film-like" compression of video image data recorded thereby.

In video post-production editing, it is sometimes desirable to intercut segments of film-derived video (e.g., video output from a telecine) with segments of other types of video. The dynamic range of a segment of film-derived video to be inserted in a non-film-derived video program may differ significantly from the dynamic range of the (non-film-derived) video. Until the present invention, it was not known how to include in a video post-production editing system a means for allowing "film-like" compression of a video signal, such as a stream of digital video data (for example, to match the dynamic range of a first, film-derived video data stream to that of a second, non-film-derived video data stream).

Various mathematical expressions have been proposed for the "characteristic curve" relating exposure (E) for photographic film to the resulting density (D) of the exposed film. One such expression is described in a technical note by A. E. S. Green and R. D. McPeters of the University of Florida, entitled "New Analytic Expressions of Photographic Characteristic Curves," in Applied Optics, Vol. 14, No. 2, February 1975. This note reintroduces a historical photometric quantity ($w_l$) called opacity, which is defined by:

$$w_l = 10^{D-D_1} - 1$$

where $D_1$ is the lower film density limit (or "base plus fog" density). The lower and middle portions of a characteristic curve can then be expressed by:

$$E = E_0 W_l^n = E_0 (10^{D-D_1} - 1)^n$$

where n is the reciprocal of gamma.

The authors then extend this concept to the upper asymptote by defining a quantity which might be called the inverse opacity, or perhaps the opacity of positive film, and is represented by:

$$w_u = 1 - 10^{\beta(D-D_u)}$$

where $D_u$ is the maximum or saturation density level and $\beta$ is a parameter which measures the shoulder curvature or asymmetry. The effective opacity is then defined by:

$$\Omega = w_l / w_u$$

and the characteristic curve is represented from low to high densities by:

$$E = E_0 \Omega^n = E_0 \{(10^{D-D_1} - 1)/(1 - 10^{\beta(D-D_u)})\}^n$$

or equivalently $$E = E_0 \Omega^n = E_0 10^{n(D-D_1)} \{(1 - 10^{-(D-D_1)})/(1 - 10^{\beta(D-D_u)})\}^n.$$

The referenced technical note sets forth a best fit analysis of the described characteristic curve model using measured density-exposure data for Panatomic-X film, and concludes that the errors are quite small. The technical note then concludes with a proposed generalization of:

$$E = E_0 \{[10^{\alpha(D-D_1)} - 1]^n / [1 - 10^{\beta(D-D_u)}]^m\},$$

which has the additional parameters of "$\alpha$" and "$m$" (where m is independent from n, and m need not equal n).

SUMMARY OF THE INVENTION

The present invention is a method and system for performing film-like compression on video signals (analog video or digital video data), to introduce film-like compression characteristics thereto. In one embodiment, the invention is a video camera including hardware and/or software (e.g., hardwired circuitry, or a processor programmed with software) for compressing video signals generated thereby to introduce film-like compression characteristics to the video signals. A video camera embodying the invention preferably includes controls which allow smooth and gradual "film-like" compression of video image data recorded thereby, in response to user variation of a compression parameter (or a small number of compression parameters).

In another class of embodiments, the invention is a video post-production editing system which includes hardware and/or software (e.g., hardwired circuitry, or a processor programmed with software) for performing "film-like" compression of an analog video signal or a stream of digital video data. Such compression can, for example, be performed to match the dynamic range of a first, film-derived video segment to that of a second, non-film-derived video segment.

In preferred embodiments, the invention implements film-like compression digitally (by employing digital circuitry which can include a digital processor programmed with appropriate software). Typically, such digital circuitry will first digitize the analog video signal to be compressed, then transform the digitized pixels using a look-up table, and finally convert the transformed pixels to an analog compressed video signal. Such digital circuitry can be included in an analog video camera embodying the invention, for analog-to-digital conversion of each color component of the camera's raw video signal, digital compression of each stream of digitized color component data in accordance with the invention, and digital-to-analog conversion of each color component of the compressed data. In variations on such digital circuitry, for processing a stream of digital video data, the means for analog-to-digital and digital-to-analog conversion can be omitted.

In alternative embodiments, the invention can be implemented as an analog circuit for processing an analog video signal.

DETAILED DESCRIPTION OF THE INVENTION

The following text initially describes a new analytical model for a general (ideal) film characteristic curve, and then describes how to apply this model to implement "film-like" highlight compression ("film-like" upper range compression) in an analog or digital video signal in accordance with the invention.

We start with a revised formulation of the above-described proposed generalized characteristic curve model:

$$E=E_0 10^{n(D-D_1)}\{(1-10^{-\alpha(D-D_1)})^n/(1-10^{-\beta(D_x-D)})^m\}.$$

Figure 1:
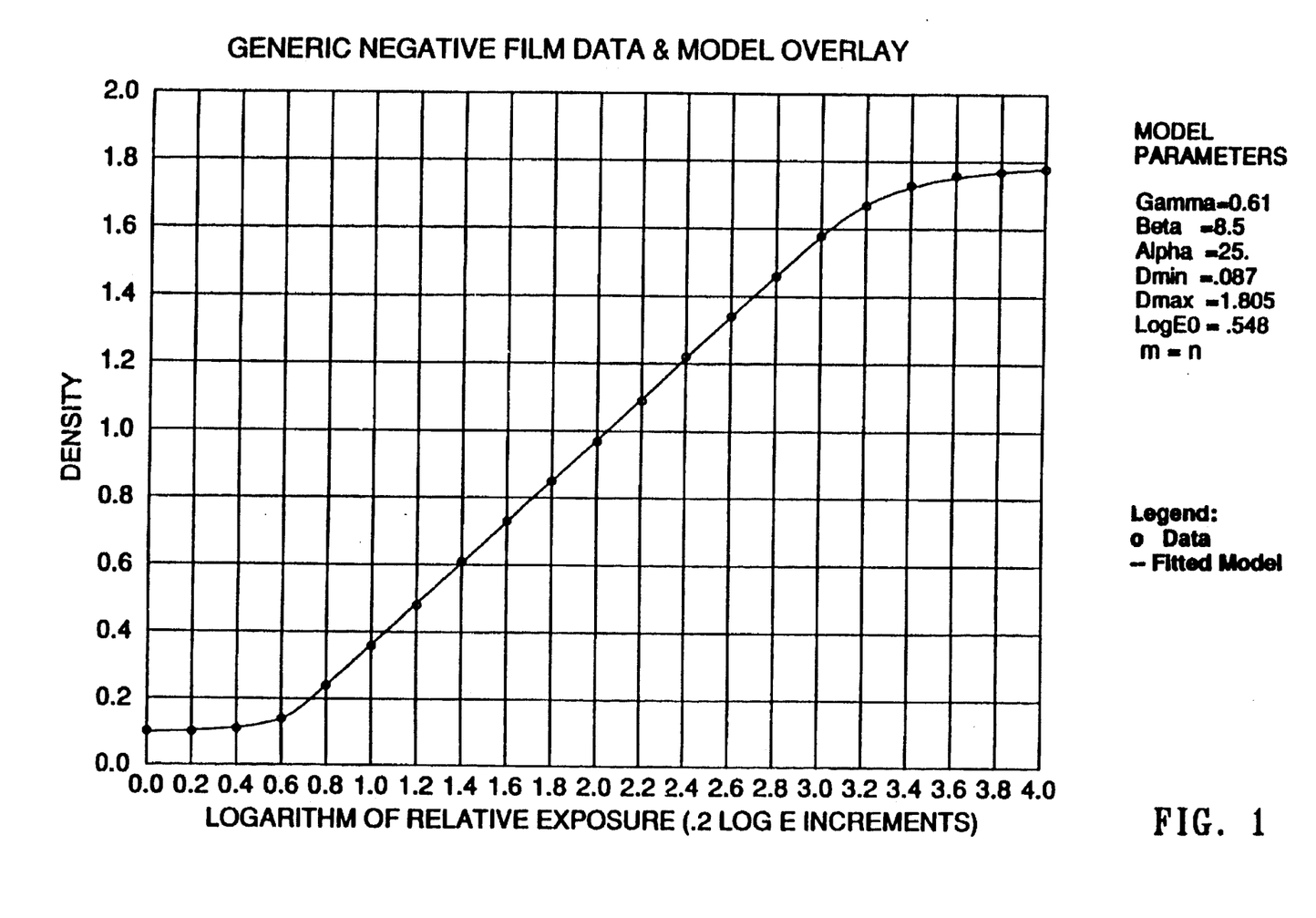
FIG. 1 is a graph of a generic negative film curve data set and model overlay. The term "generic" in this case means measured data from a number of different negative photographic film stocks averaged together.

This formulation has been compared to a wide variety of film types and has been shown to fit real characteristic curve data well. Three such examples are given in FIGS. 1, 2, and 3. In these examples, the model is fitted to generic negative, interpositive, and print film data sets which have been arrived at by averaging a number of film stocks together to create a typical or average characteristic curve for each film family type. It has been found by empirical investigation that $m=1$ works well in attempting to represent characteristic curves of print film, and $m=n$ works equally well with negative and intermediate stocks. For this reason, $m=1$ and $m=n$ represent preferred embodiments of the invention.

Since for highlight compression it is sufficient to characterize only the middle to upper portions of this modelled HD curve, the above formulation reduces (for such purpose) to:

$$E=E_0 10^{n(D-D_1)}(1-10^{\beta(D-D_x)})^{-m}$$

In a non-logarithmic video compression transform the linear light or signal domain should map into itself and so we need to remove density from the above expression. With a negative film, process film opacity $w_r$, which is the inverse of light transmittance T, is given by:

$$w_r=T^{-1}=10^{D-D_1}-1$$

but in mimicking a positive film transform function, as is our objective in video compression, the output transmittance light E' can, for our purposes, be expressed directly by:

$$E'=10^{(D-D_1)}-1.$$

We substitute and get:

$$E=E_0\left[\cfrac{1}{1-\left(\cfrac{E+1}{E_{max}}\right)^{\beta}}\right]^m (E+1)^n$$

Or, simpler yet, if we want zero to map to itself then, the basic form of the transformation is:

$$E = \text{ScaleFactor} \left[ \frac{1}{1 - \left( \frac{E}{E_{max}} \right)^{\beta}} \right]^{m} (E)^{n}$$

with parameters m, n=1/gamma; shoulder curvature β (representing the amount of shoulder curvature present in the characteristic curve, with increased β representing less shoulder); and "timing" parameter Emax which is a measure of how far up on the characteristic curve the image is, i.e. the degree of overexposure. Gamma, m, and β can be regarded as fixed characteristics of the film type being imitated or even set to average, normal values. Emax then becomes the one parameter control of the amount of overexposure or highlight compression desired. Alternatively, highlight compression can be controlled by varying both β and Emax.

To flexibly simulate the placement of the subject image within the dynamic range of 0 to Emax we add a final parameter to yield:

$$E = \text{ScaleFactor} \left[ \frac{1}{1 - \left( \frac{E + E_s}{E_{max}} \right)^{\beta}} \right]^{m} (E)^{n}$$

where $E_s$ will be an offset in the range [0,Emax] and $E+E_s$ will always be strictly less than Emax. With m =1 (or m=n), and β and Emax fixed, $E_s$ then becomes a one parameter control of the amount of highlight compression.

If it is desired to map an input luminance level of 1.0 to a video level of 1.0 (as in the case of no highlight compression) and if the variables in the preceding expression are renamed, we have the following expression for an inverse compression function:

$$L = \left[ \frac{1}{1 - \left( \frac{V + V_s}{V_{max}} \right)^{\beta}} \right]^{m} (V)^{n} \quad (1)$$

where V, $V_s$, and $V_{max}$ are the output video signal, offset, and maximum respectively, and L is the input relative scene luminance. The parameter m is a modelling characteristic for which empirical research has shown m=1 to be a value that allows a wide variety of film types to be accurately represented. This being also simpler to implement, the value of m =1 is regarded as a best mode implementation and the best mode inverse compression function then is:

$$L = \left[ \frac{1}{1 - \left( \frac{V + V_s}{V_{max}} \right)^{\beta}} \right] V^{n} \quad (2)$$

where "n" is (gamma)$^{-1}$ as in the preceding transform. The system of the invention can be designed, however, to permit a user to independently control the parameter "m" in transform (1), and indeed to independently control any one or more of the parameters in transform (1). For some applications, the preferred transform will be transform (1), with m =n.

The transform set forth in the preceding paragraph is actually the mathematical inverse of what is needed for implementing a video mimic of film-like overexposure or highlight compression in accordance with the invention, since the transform represents a mapping from a compressed video level (V) to a relative scene luminance (L). To implement video compression digitally in accordance with the invention, any of a number of numerical means standard in the art can be used to generate the inverse relationship in a look-up table. One such method involves the generation of one or more look-up tables L=F(V)$_{LUT}$ representing the transform (each table representing relative scene luminance, L, as a function of video level, V, and a set of transform parameters), and the use of the generated look-up tables (LUTs) to linearly interpolate the desired inverse relationship. In this approach, to find an output video level V corresponding to an input luminance L, the bracketing indices of the table L=F(V)$_{LUT}$, i.e., $V_{lower}$ and $V_{upper}$ such that F($V_{lower}$)<L <F($V_{upper}$), are found by a table search, and then V is determined by linear interpolation. Other methods of interpolation standard in the art may be used for generation of an inverse look-up table.

Figure 9:
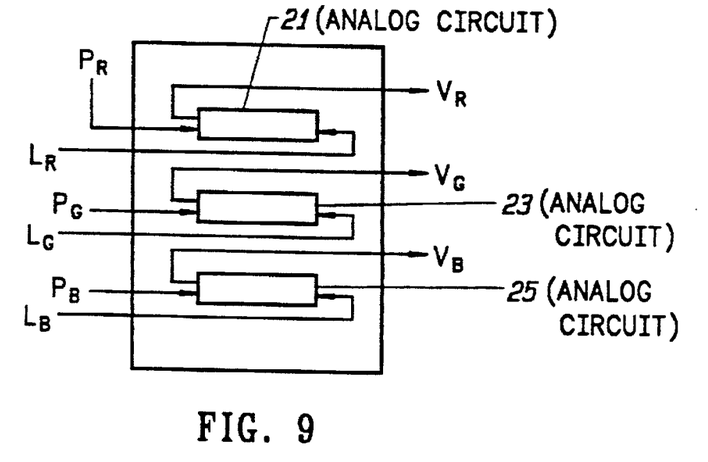
FIG. 9 is a block diagram of an analog circuit for implementing the invention.

A preferred apparatus for performing film-like compression of an analog video signal in accordance with the invention is shown in FIG. 9. The circuit of FIG. 9 receives three analog color component signals ("red" signal $L_R$, "green" signal $L_G$, and "blue" signal $L_B$) which together comprise an analog color video signal. Signal $L_R$ is converted by analog circuit 21 to a signal $V_R$, signal $L_G$ is converted by analog circuit 23 to a signal $V_G$, and signal $L_B$ is converted by analog circuit 25 to a signal $V_B$. Each of circuits 21, 23, and 25 is designed to implement transform (1) or transform (2). The output terminals of circuits 21, 23, and 25 are connected to receive input signals $L_R$, $L_G$, and $L_B$, respectively, so that the signals $V_R$, $V_G$, and $V_B$ will appear at the input terminals thereof (as a result of application of transform (1) or (2) in each of circuits 21, 23, and 25). Preferably, each of circuits 21, 23, and 25 is controllable (in response to externally supplied control signals $P_R$, control signals $P_G$, or control signals $P_B$, as shown in FIG. 9), to apply a selected set of values of transform parameters (determined by such control signals) in implementing its transform.

Another technique for performing film-like compression of an analog video signal in accordance with the invention is to develop an analytic (closed form) approximate inverse expression of either transform (1) or transform (2), and then to implement this analytic inverse expression using analog circuitry which receives the input analog video (and outputs compressed analog video).

In one class of preferred embodiments for simulating the behavior of a generic negative film, the invention performs video compression in accordance with the inverse of a special case of transform (1), in which:

m=n;

gamma=(1/n)=0.61;

beta (β)=8.5; and the input/output ranges are restricted as follows: V is restricted to the interval [0,1] and L is restricted to the interval [0,6], and $V_s$ is restricted to the half open interval [0,1], with $V_{max}$=2.

Figure 4:
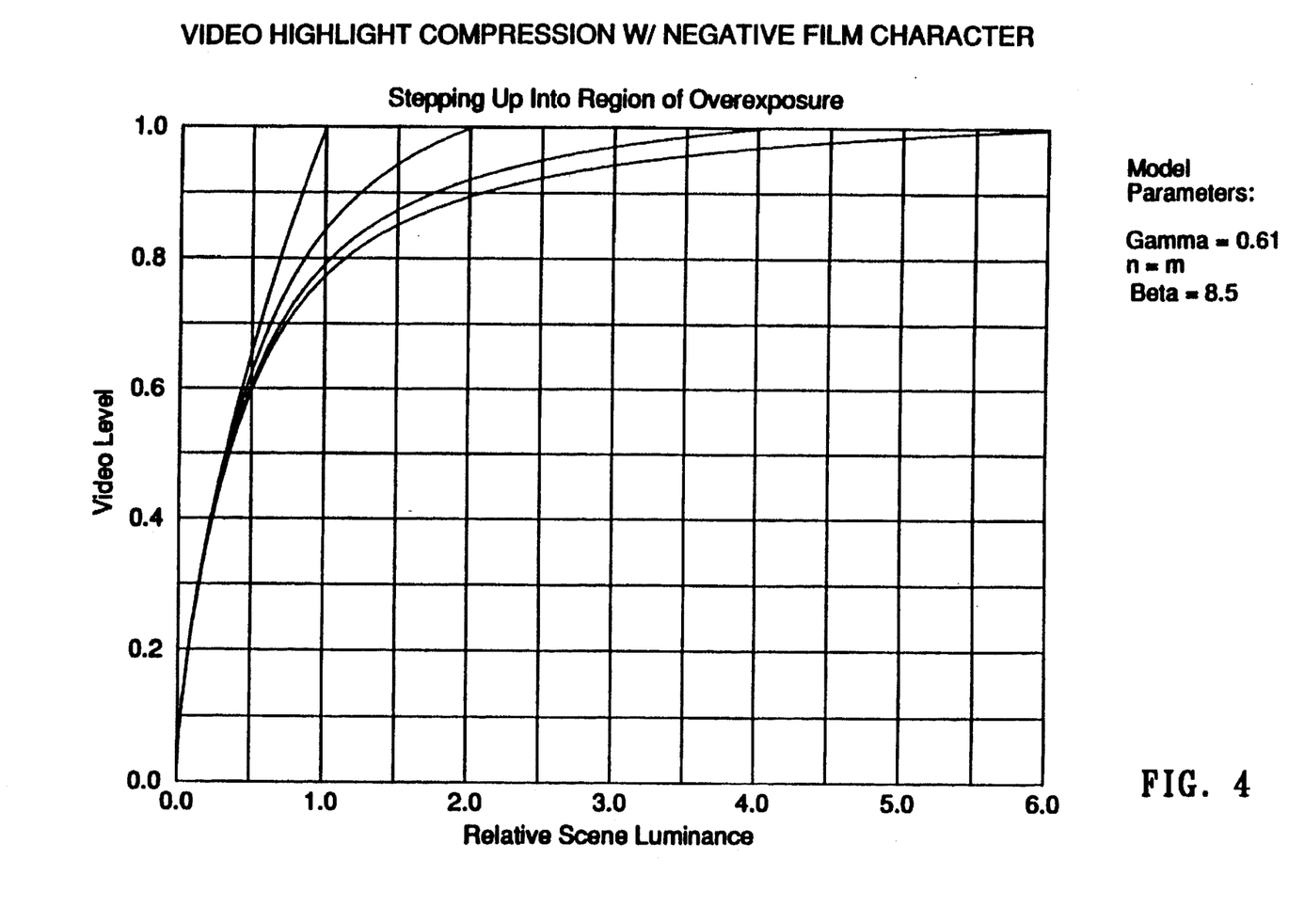
FIG. 4 is a graph of a video compression curve, with generic characteristics of negative photographic film, of the type employed in a first implementation of the invention.

FIG. 4 is a graph obtained by plotting this special case of transform (1) for each of several values of control parameter $V_s$, as said parameter $V_s$ is stepped up toward "one" (its upper limit). The transform represented by FIG. 4 is a good model of the compression curve derived from a "generic" photographic negative film characteristic curve.

Figure 2:
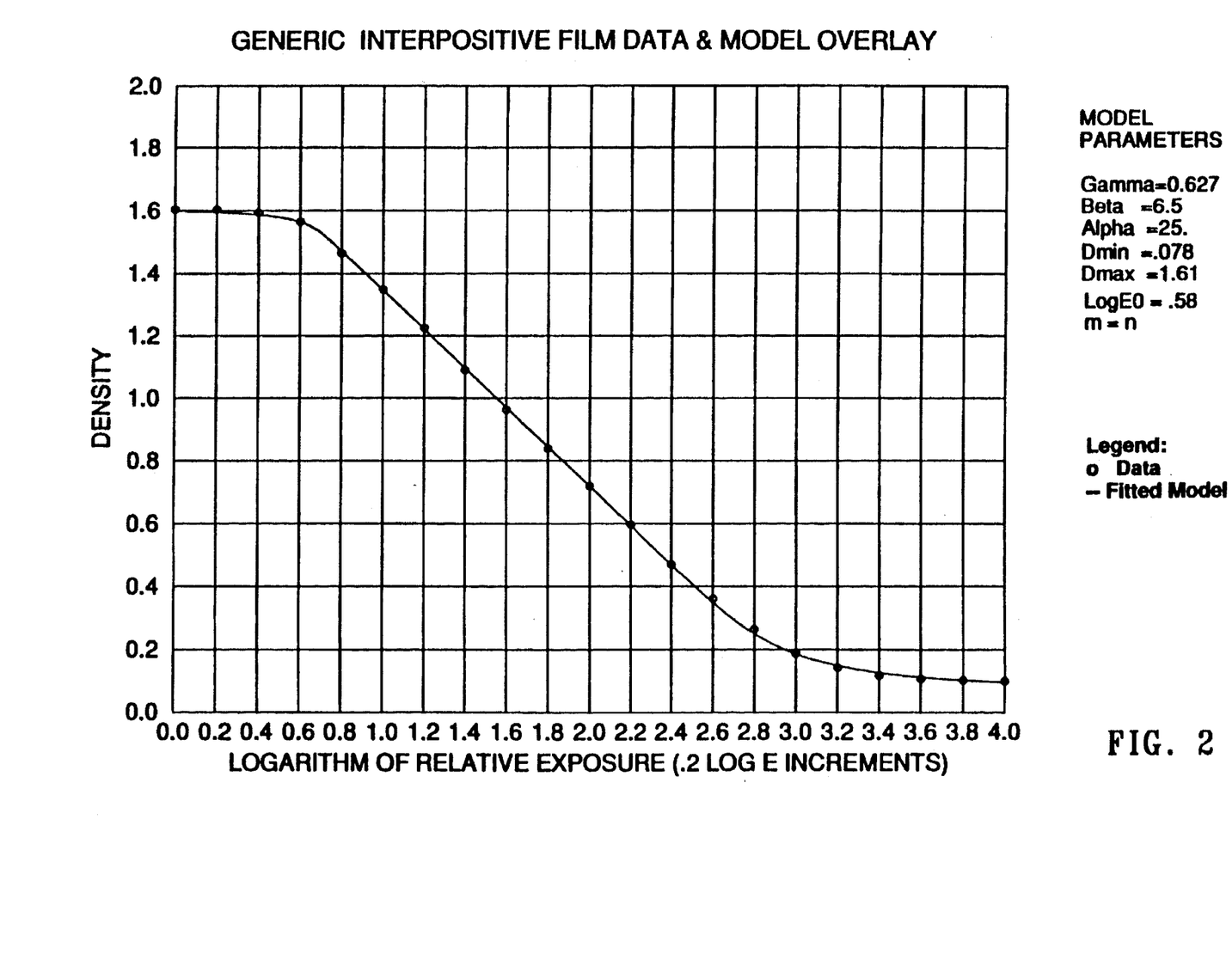
FIG. 2 is a graph of a generic interpositive film curve data set and model overlay. The term "generic" in this case means measured data from a number of different interpositive photographic film stocks averaged together.
Figure 3:
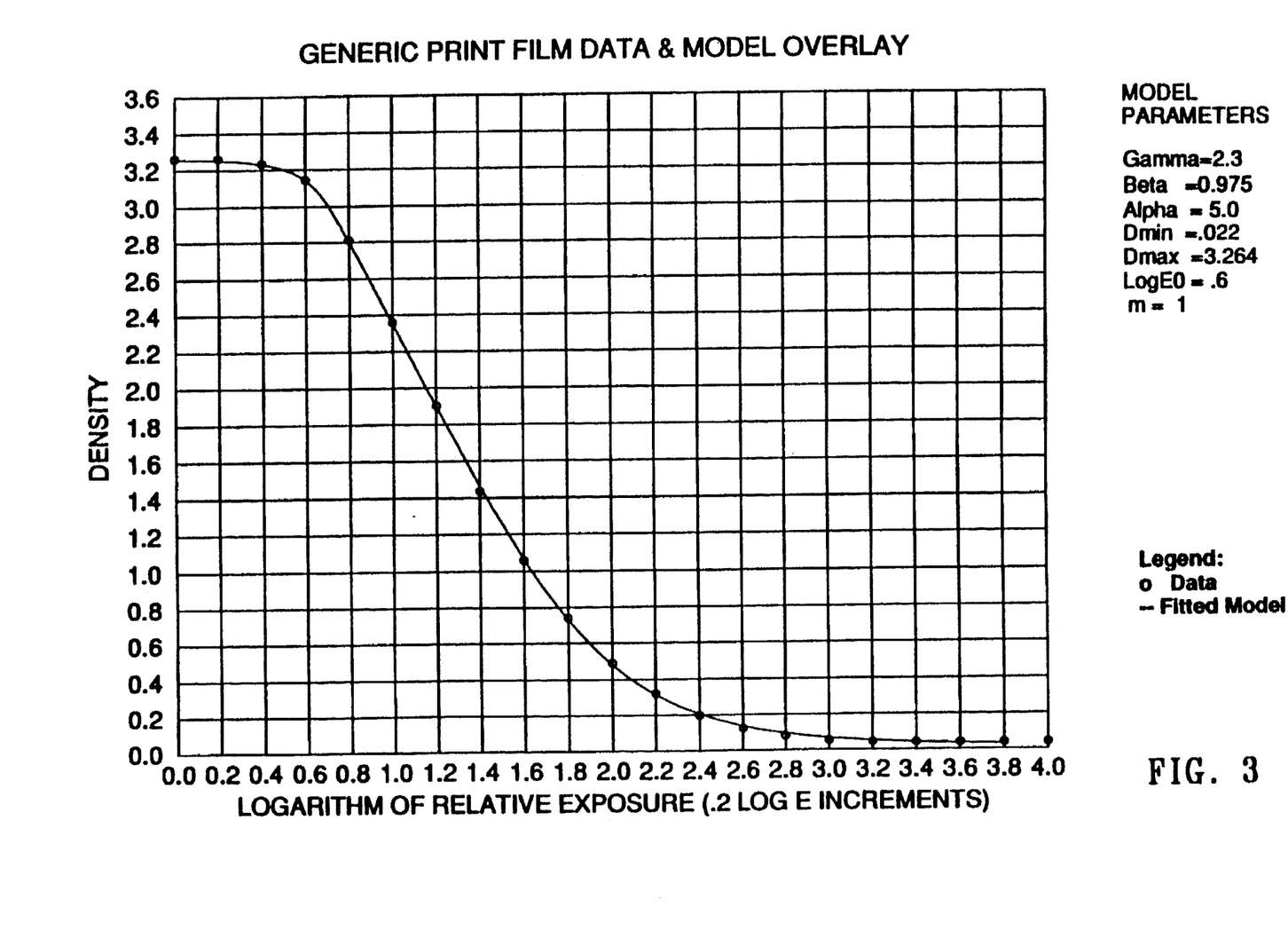
FIG. 3 is a graph of a generic print film curve data set and model overlay. The term "generic" in this case means measured data from a number of different print photographic film stocks averaged together.
Figure 5:
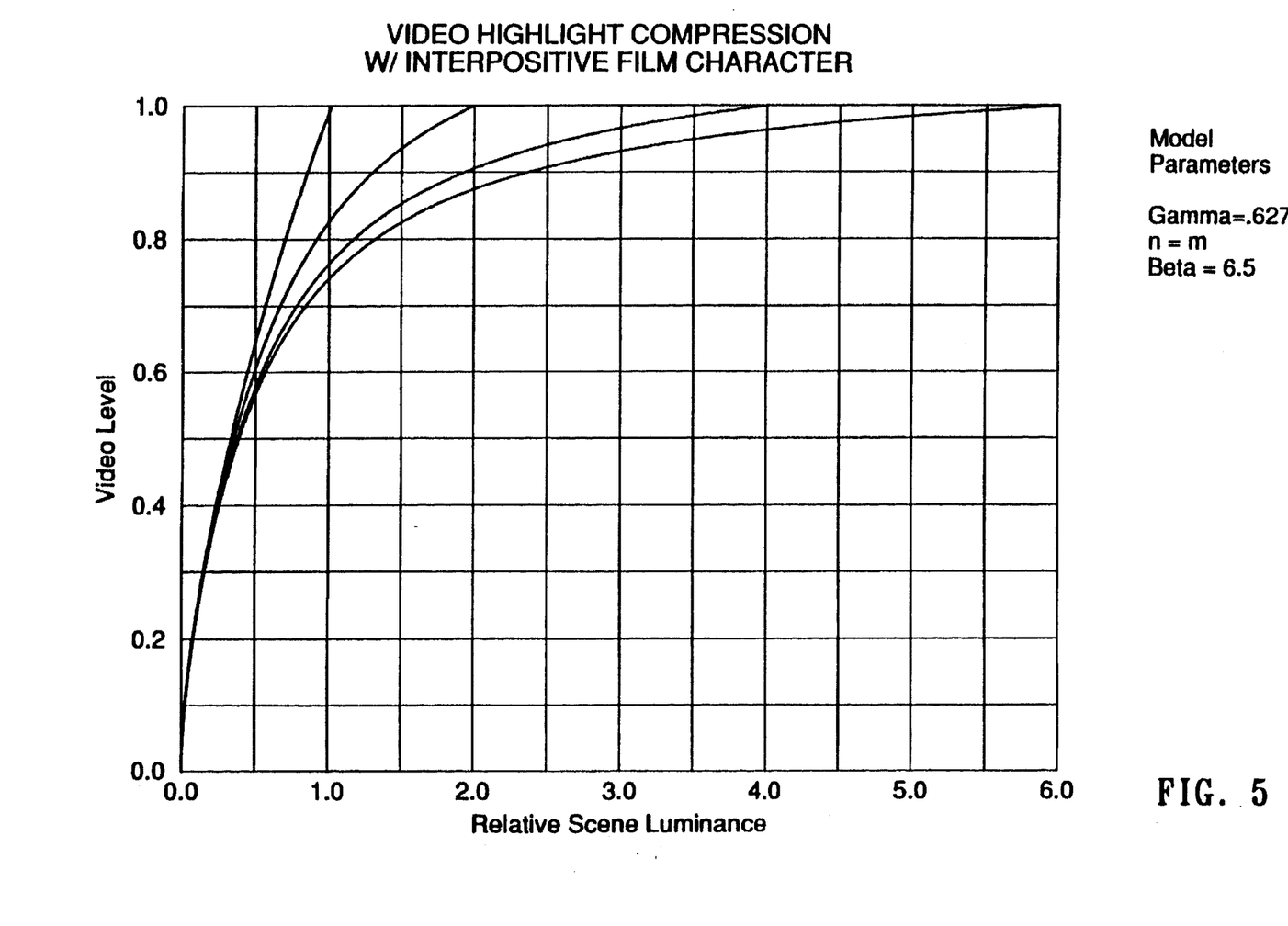
FIG. 5 is a graph of a video compression curve, with generic characteristics of interpositive photographic film, of the type employed in another implementation of the invention.

In a second preferred embodiment, for simulating the highlight compression behavior of generic interpositive film as in FIG. 2, the invention performs video compression in accordance with the inverse of transform (1), in which m=n, β=6.5, gamma=0.627, and the input/output ranges are restricted in the same (or similar) fashion as in the FIG. 4 embodiment. FIG. 5 is a graph obtained by stepping the control parameter $V_s$ up toward its upper limit (one) in this second preferred embodiment.

Figure 6:
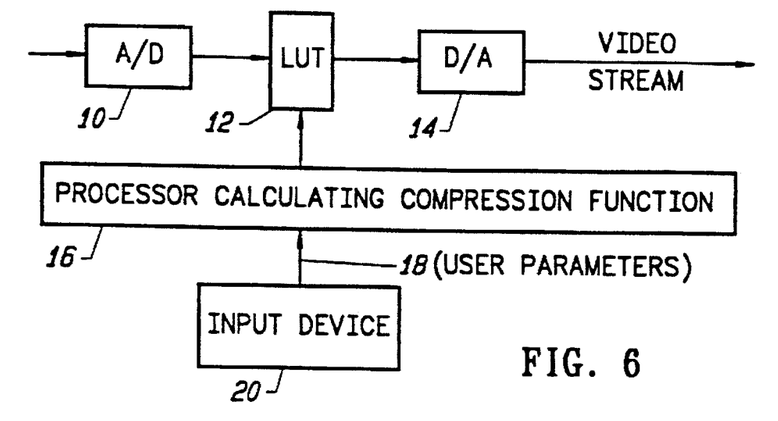
FIG. 6 is a block diagram of a video signal compression system embodying the invention.

In a class of preferred embodiments, the invention is a system of the type shown in FIG. 6. The system of FIG. 6 digitally implements film-like compression on an analog video signal, by employing digital circuitry including processor 16 programmed with software for computing a film-like compression function in response to user-specified parameters 18 supplied thereto from input device 20 (which can be a keyboard). The analog video input signal (which can be generated using an analog video camera) is digitized in analog-to-digital conversion circuit 10. The digitized pixels output from A-to-D converter 10 (which are relative scene luminance values, L) are supplied to look-up table 12. In response to each pixel, LUT 12 outputs a transformed pixel, and the transformed pixels from LUT 12 (which are video levels V) are converted by digital-to-analog converter 14 into an analog compressed video signal.

Preferably, processor 16 is programmed to generate LUT 12, in such a manner that LUT 12 is a look-up table of the inverse of either above-described transform (1) or (2). Because each of transforms (1) and (2) is the mathematical inverse of what is needed for implementing film-like compression on video data in accordance with the invention, processor 16 is programmed in two steps as follows. Processor 16 utilizes one of the transforms (and a fixed set of user-specified, or default, values of the transform parameters) to generate intermediate tables of relative scene luminances each indexed by video levels V. As explained above, any of a number of numerical means standard in the art can now be used to generate the inverse relationship (e.g., one or more inverse look-up tables) by means of the intermediate tables. One such method of linear interpolation is to generate one or more forward look-up tables $L=F(V)_{LUT}$ representing the selected transform (each table representing relative scene luminance, L, as a function of video level, V, and a set of transform parameters), and then to use these generated forward LUTs to linearly interpolate the desired inverse LUT (or LUTs). In this simple and common approach, to find an output video level V corresponding to an input luminance L, the bracketing indices of the table $L=F(V)_{LUT}$, i.e., $V_{lower}$ and $V_{upper}$ such that $F(V_{lower}) < L < F(V_{upper})$, are found. Then V is determined (or set) to be the same fractional or proportional distance between $V_{lower}$ and $V_{upper}$ that L is between $F(V_{lower})$ and $F(V_{upper})$.

More specifically, processor 16 can compute intermediate forward look-up tables, which are a set of relative scene luminance values L from various values of a video level V for a user-specified set 18 of parameters β, $V_{max}$, and n (from transform (2)), or from various values of a video level V and a user-specified set 18 of parameters β, $V_{max}$, m, and n (from transform (1)). Then, processor 16 can hold these intermediate forward values (for a set 18 of parameters) in a random access memory (which can be internal) by writing these values L into look-up table processor storage locations indexed by the corresponding values V. Then processor 16 can be used to generate, by interpolation of the intermediate tables in the random access memory, the final inverse table values to be loaded into LUT 12. Any of a number of interpolation techniques standard in the art can be used in this inverse interpolation. One such method is the common simple method of linear interpolation.

If the input video signal to be compressed is a color video signal, each pixel received by LUT 12 will comprise three color component values (e.g., Red, Green, and Blue component values). In one embodiment, a subset of the storage locations of LUT 12 is allocated to each of the three color components, so that LUT 12 outputs three sets of compressed color component values (e.g., parallel "Red," "Green," and "Blue" streams, or one time-division-multiplexed stream). Alternatively, LUT 12 can be replaced by three separate LUTs (one for each color component), so that each of these three LUTs receives a different stream of color components and outputs a corresponding stream of compressed color components.

Variations on the FIG. 6 circuit, for processing a stream of digital input video data (which can be a stream of digital color video data), can omit analog-to-digital converter 10 and digital-to-analog converter 14.

Figure 8:
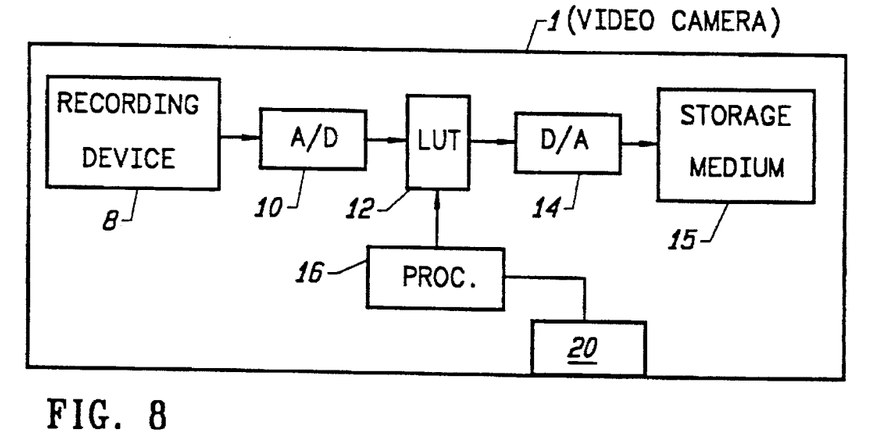
FIG. 8 is a block diagram of a video camera embodying the invention.

FIG. 8 is a simplified block diagram of video camera 1 which embodies the invention. Video camera 1 includes image sensor 8 (which can be of the well-known CCD type), which outputs color analog video comprising frames of pixels. Each pixel is determined by voltages proportional to the relative scene luminance L of a portion of the image being recorded. More specifically, each pixel comprises three color component values (e.g., red, green, and blue values), and each color component value is determined by a voltage proportional to the relative scene luminance (e.g., $L_R$, $L_G$, or $L_B$) of a portion of a color component (red, green, or blue) of the image being recorded.

In FIG. 8, the analog video from image sensor 8 is then processed by the compression system (comprising components 10, 12, 14, 16, and 20) described above with reference to FIG. 6. In the FIG. 8 embodiment, input device 20 will typically be a set of one or more knobs, dials, or slider controls which can be manipulated by a user to select desired film-like compression parameters. The compressed color video signal asserted at the output of D-to-A converter 14 (which has undergone film-like compression in accordance with the invention) is recorded in the camera's storage medium 15 (which can be a video tape cassette).

Figure 7A:
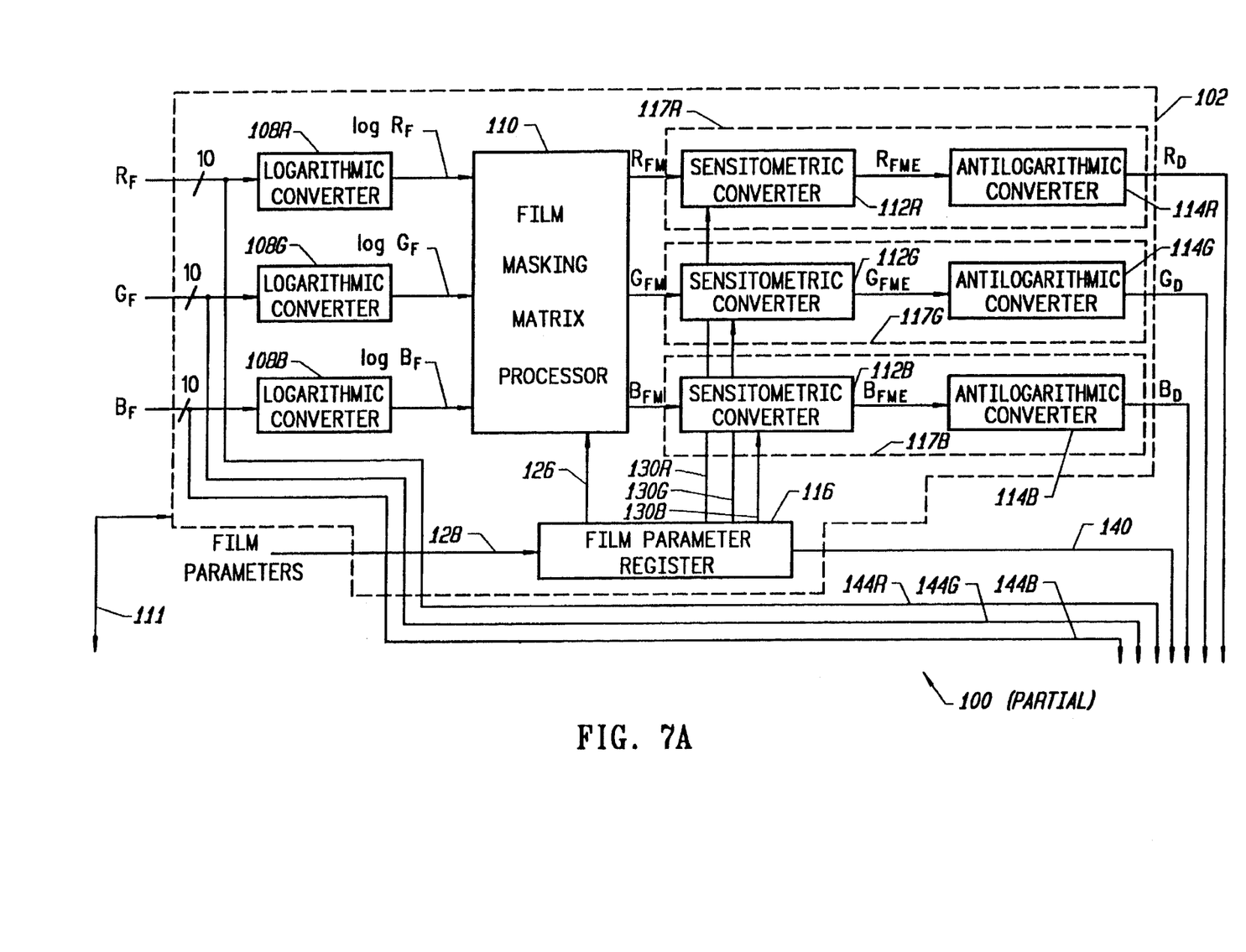
FIGS. 7A and 7B, together, are a block diagram of a digital color video processing apparatus useful for implementing a preferred embodiment of the method of the invention.
Figure 7B:
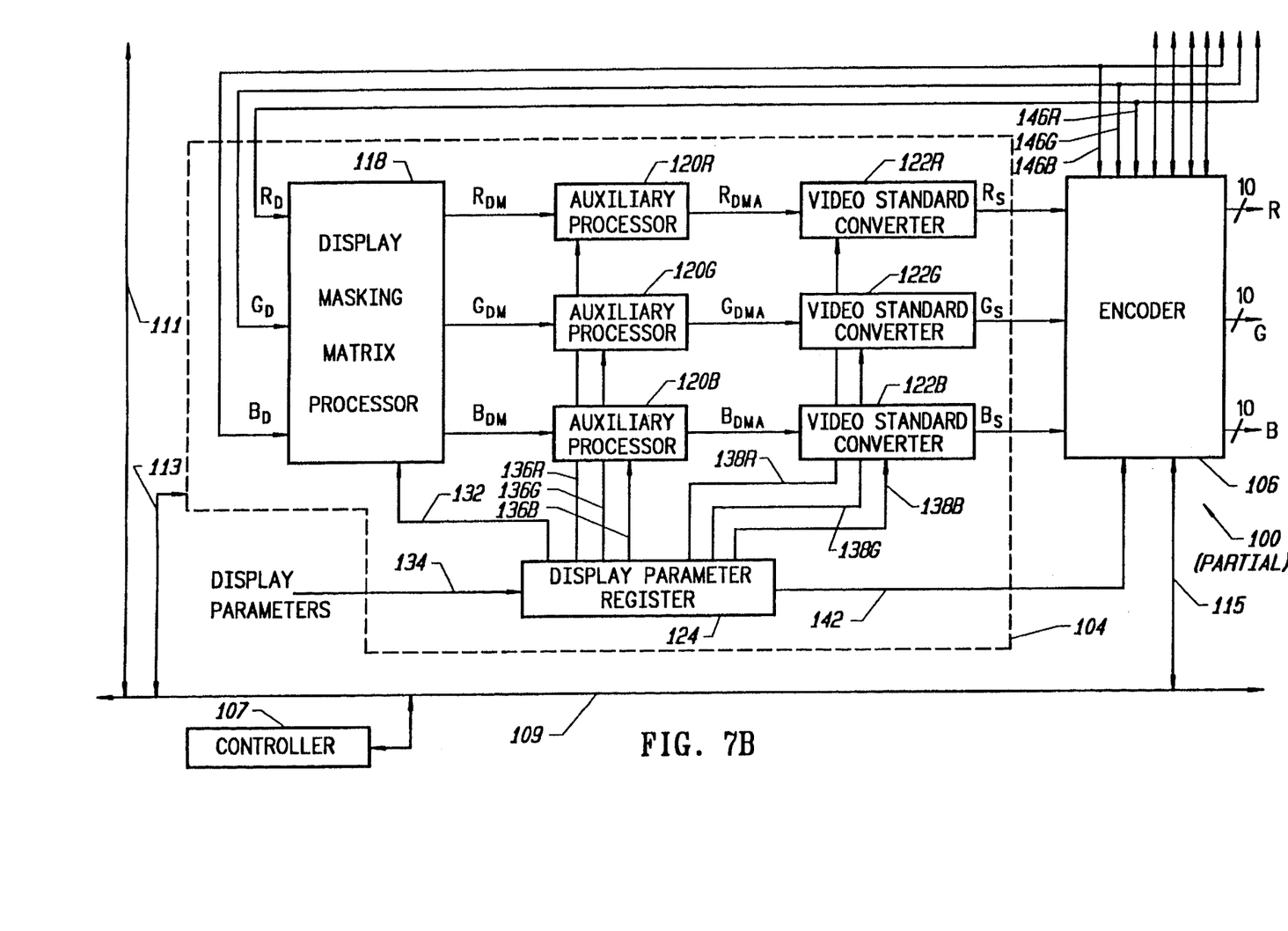

The present invention can be embodied in the apparatus disclosed in commonly assigned, copending U.S. patent application Ser. No. 07/710,704 filed Jun. 5, 1991, the text of which is incorporated herein by reference (if appropriate the look-up-tables thereof are loaded with parameters for implementing "film-like" compression in accordance with the present invention). An example of such apparatus will be described with reference to FIGS. 7A and 7B. FIGS. 7A and 7B (which are identical to FIGS. 1A and 1B of referenced U.S. application Ser. No. 07/710,704, and are more fully described therein) show a digital color video processing system consisting of three basic functional subsystems: a film parameter corrector 102; a video parameter corrector 104; an encoder 106; and a controller 107. The input video data streams $R_F$, $G_F$, $B_F$ and output video data streams R, G, B, as well as the intermediate signals generated before generation of output streams R, G, and B, are digital. In a preferred embodiment, each input $R_F$, $G_F$, $B_F$ stream, and each output stream R, G, B is a stream of ten parallel bits of information. Also, as seen in the drawings, signals having various quantities of parallel bits (e.g. 12, 16, 18 or 24) are used throughout the system, depending upon the particular function being performed.

However, it should be understood that such signal bit quantities are merely exemplary and that, in accordance with the invention, fewer or greater numbers of signal bits can be used, depending upon the desired resolution or accuracy. It should be further understood that as technology economically allows, a greater number of bits for the input and output color component streams, e.g. 12, may be more desirable. Indeed, it has been suggested that color channels with at least 12 bits should be sufficient to ensure virtually error-free color reproduction, i.e. no visually perceptible quantization errors or anomalies (B. J. Lindbloom, "Accurate Color Reproduction for Computer Graphics Applications," Computer Graphics, Vol. 23, No. 3, July 1989).

Each of the functions performed within each subsystem 102, 104, 106, as described more fully below, is performed in a digital and synchronous manner. In other words, each signal is processed digitally and synchronously. Controller 107, via control bus 109 and control interfaces 111, 113, 115, coordinates and synchronizes the operations of the film parameter corrector 102, video parameter corrector 104, and encoder 106.

Throughout FIGS. 7A and 7B and the following discussion, several corresponding functional elements are referred to with like numerical designators having "R," "G" or "B" suffixes. The use of these suffixes is intended to indicate that those corresponding elements perform similar functions for their respective video color signals (e.g. red, green and blue).

Further, the following discussion refers to the color signals as corresponding to red, green and blue. However, it should be understood that other complementary color combinations can be used, as desired. For example, the color trio of cyan, magenta and yellow can be used with equal effectiveness. Indeed, providing for the selective use of alternative color trios (e.g. red, green and blue, or alternatively, cyan, magenta and yellow) is within the scope of the present invention and can be quite desirable to allow for the processing of either positive or negative film images.

Alternatively, a luminance-chrominance signal trio, comprising a luminance signal ("Y"), a red chrominance signal ("$P_R$") and a blue chrominance signal ("$P_B$"), can be used in accordance with the present invention. The luminance signal Y represents monochromatic brightness; the red chrominance signal $P_R$ represents the difference between the red and luminance signals ("R–Y"); and the blue chrominance signal $P_B$ represents the difference between the blue and luminance signals ("B–Y").

It should be further understood that the signal and interface lines discussed below can be provided and operated in either serial or parallel protocols, as desired. However, for maximum processing speeds, most if not all signals should preferably have their respective bits transferred or processed in parallel.

As discussed in more detail below, the film parameter corrector 102 comprises separate logarithmic converters 108R, 108G, 108B, a film masking matrix processor 110, separate sensitometric and antilogarithmic converters 117R, 117G, 117B, and a film parameter register 116, all connected substantially as shown. For the sake of simplicity in understanding their functional operations, the sensitometric and antilogarithmic converter assemblies 117R, 117G, 117B are illustrated and discussed as having separate corresponding sensitometric 112R, 112G, 112B and antilogarithmic 114R, 114G, 114B converters. However, as discussed further below, the corresponding sensitometric 112R, 112G, 112B and antilogarithmic 114R, 114G, 114B converters are preferably combined together as sensitometric and antilogarithmic converter assemblies 117R, 117G, 117B.

The logarithmic converters 108R, 108G, 108B receive corresponding input signals $R_F$, $G_F$, $B_F$ and provide corresponding output signals log $R_F$, log $G_F$, log $B_F$ which are received by the film masking matrix processor 110. The film masking matrix processor 110 provides corresponding output signals $R_{FM}$, $G_{FM}$, $B_{FM}$ which are received by the input color signal ports of the sensitometric converters 112R, 112G, 112B. The sensitometric converters 112R, 112G, 112B provide corresponding output signals $R_{FME}$, $G_{FME}$, $B_{FME}$ which are received by the antilogarithmic converters 114R, 114G, 114B. The antilogarithmic converters 114R, 114G, 114B provide corresponding output signals $R_D$, $G_D$, $B_D$ which are received by the display masking matrix processor 118 within the video parameter -5 corrector 104 and by the encoder 106, as discussed below. The logarithmic 108R, 108G, 108B and antilogarithmic 114R, 114G, 114B converters preferably operate according to base ten logarithms ($\log_{10}$).

Film parameter register 116 receives film color correction parameter data via a film parameter interface 128, and provides the appropriate data to the parameter signal ports of the film masking matrix processor 110 via a processor interface 126 and to individual sensitometric converters 112R, 112G, 112B via separate converter interfaces 130R, 130G, 130B.

Input signals $R_F$, $G_F$, $B_F$ are digital video signals representing red, green, and blue components of a color video signal (which have typically but not necessarily been generated by converting color film image data into video in a telecine or the like, in which case they represent red, green, and blue colored optical film images, respectively). Input signals $R_F$, $G_F$, $B_F$ are supplied to the inputs of, and converted by, their respective logarithmic converters 108R, 108G, 108B to their logarithmic equivalents, i.e. "log $R_F$," "log $G_F$," and "log $B_F$," for color masking within film masking matrix processor 110. Each of logarithmic converters 108R, 108G, 108B comprises a look-up table ("LUT"), wherein the respective input signals $R_F$, $G_F$, $B_F$ address the contents thereof, which in turn, provide the respective logarithmic equivalent signals log $R_F$, log $G_F$, log $B_F$, which are then inputted into film masking matrix processor 110. However, it should be understood that other conversion means can be used, as desired, such as digital adders or multipliers, a microprocessor, a reduced instruction set controller ("RISC"), a custom digital signal processor ("DSP"), a custom very large scale integrated circuit ("VLSI"), or a spline generator. By using a spline generator, virtually all mathematical functions can be approximated with a relatively high degree of accuracy. Higher or lower order splines can be used depending upon the desired accuracy, but a cubic spline represents a good compromise between accuracy, complexity and speed. Further, by using a spline generator, the size of LUTs needed are smaller (because, rather than accessing one very large LUT to obtain the appropriate output signal, e.g. the logarithmic equivalent of the input signal, much smaller LUTs can be used).

Within film masking matrix processor 110 the logarithmic equivalents log $R_F$, log $G_F$, log $B_F$ of the input signals $R_F$, $G_F$, $B_F$ are color masked in accordance with film masking matrix coefficients to produce corresponding color masked film signals $R_{FM}$, $G_{FM}$, $B_{FM}$. This masking desirably compensates, i.e. corrects, for crosstalk effects within the film color signals due to crosstalk between the red, green and blue emulsions of the original film stock. This masking is accomplished by modifying, e.g. scaling and mixing, the film color information contained within the respective film color signals log $R_F$, log $G_F$, log $B_F$. These color masking operations are performed substantially in accordance with the following formula:

$$\begin{bmatrix} R_{FM} \\ G_{FM} \\ B_{FM} \end{bmatrix} = \begin{bmatrix} F_{RR} & F_{RG} & F_{RB} \\ F_{GR} & F_{GG} & F_{GB} \\ F_{BR} & F_{BG} & F_{BB} \end{bmatrix} \begin{bmatrix} \log R_F \\ \log G_F \\ \log B_F \end{bmatrix} + \begin{bmatrix} C_{FR} \\ C_{FG} \\ C_{FB} \end{bmatrix}$$

where:

$R_{FM}$=masked Red film signal $G_{FM}$=masked Green film signal $B_{FM}$=masked Blue film signal $F_{XY}$=film masking matrix coefficients (for contribution to "X"-colored film signal by "Y"-colored light)

$C_{FX}$=film correction factors (for "X"-colored film signal)

The film masking matrix coefficients $F_{XY}$, as well as the film correction factors $C_{FX}$, are inputted into the film masking matrix processor 110 from the film parameter register 116 via a signal interface 126. In turn, the film parameter register 116 receives the film masking matrix coefficients $F_{XY}$ and film correction factors $C_{FX}$ from an outside source, e.g. a computer or keyboard input interface (not shown), via a film parameter interface 128. These coefficients $F_{XY}$ and factors $C_{FX}$ can be modified as desired by entering new values (e.g. computed from identified color changes) or adjusting the default values via the film parameter interface 128.

The film masking matrix coefficients $F_{XY}$ have default values which can be determined (e.g. computed) from film data available on film data sheets provided by the film manufacturer or selected by the user. Alternatively, if little or no masking is deemed necessary or desirable, the "diagonal" coefficients (i.e. $F_{RR}$, $F_{GG}$, $F_{BB}$) can each be given a value of unity and the "off diagonal" coefficients (i.e. $F_{RG}$, $F_{RB}$, $F_{GB}$, $F_{GR}$, $F_{BR}$, $F_{BG}$) can each be given a value of zero.

The film masking matrix coefficients $F_{XY}$ are determined by "inverting" the film dyes' natural masking. For example, an apparent "red" signal representing a color corresponding to the frequency F1 will actually be due in part to the true "red," "green" and "blue" signals. Mathematically, this can be expressed by the following coupled formulas which are the "inverse" of those discussed above:

$$\begin{bmatrix} \log R_F \\ \log G_F \\ \log B_F \end{bmatrix} = \begin{bmatrix} IF_{RR} & IF_{RG} & IF_{RB} \\ IF_{GR} & IF_{GG} & IF_{GB} \\ IF_{BR} & IF_{BG} & IF_{BB} \end{bmatrix} \begin{bmatrix} R_{FM} \\ G_{FM} \\ B_{FM} \end{bmatrix} + \begin{bmatrix} IC_{FR} \\ IC_{FG} \\ IC_{FB} \end{bmatrix}$$

where:

$R_{FM}$=masked (true) Red film signal $G_{FM}$=masked (true) Green film signal $B_{FM}$=masked (true) Blue film signal $IF_{XY}$=inverse film masking coefficients obtained directly from the relative response curves and normalized (for contribution to "X"-colored film signal by "Y"-colored light)

$IC_{FX}$=inverse film correction factors (for "X"-colored film signal)

The film masking matrix coefficients $F_{XY}$ and film correction factors $C_{XY}$ can then be determined by solving the above set of three linear equations by standard methods, e.g. by inverting the matrix above to "invert" the physical film transformation due to the colored dyes' responses. Thus, for example, some typical default values for the film masking matrix coefficients $F_{XY}$ for Kodak® 5247 color negative film would be:

$$\begin{bmatrix} F_{RR} & F_{RG} & F_{RB} \\ F_{GR} & F_{GG} & F_{GB} \\ F_{BR} & F_{BG} & F_{BB} \end{bmatrix} = \begin{bmatrix} 0.89 & 0.07 & 0.04 \\ 0.02 & 0.94 & 0.04 \\ 0.02 & 0.14 & 0.84 \end{bmatrix}$$

The film correction factors $C_{FX}$ and inverse film correction factors $IC_{FX}$ represent fixed (e.g. dc) signal parameters and can be used to provide additional signal amplification or attenuation. However, typically these factors $C_{FX}$ will each be given a value of zero (i.e. unity in terms of original signal amplification or attenuation).

The color masked film signals $R_{FM}$, $G_{FM}$, $B_{FM}$ outputted from film masking matrix processor 110 are then separately sensitometrically and antilogarithmically converted by their respective sensitometric and antilogarithmic converter assemblies 117R, 117G, 117B. Each color masked film signal $R_{FM}$, $G_{FM}$, $B_{FM}$ is preferably sensitometrically converted substantially in accordance with a Hurter-Driffield ("HD") characteristic curve, which represents the relationship between film dye density and the logarithm of the film dye exposure. The color masked film signals $R_{FM}$, $G_{FM}$, $B_{FM}$, each representing red, green and blue film dye densities with film masking (i.e. with crosstalk effects minimized or eliminated), are converted by their respective sensitometric converters 112R, 112G, 112B into corresponding logarithmic exposure equivalents $R_{FME}$, $G_{FME}$, $B_{FME}$. This sensitometric conversion is done substantially in accordance with the following formula:

$$E_x = E_{xo}[(10^{Ax(Dx-Dx1)}-1)/(1-10^{Bx(Dx-Dxu)})]^{Nx}$$

where:

$E_x$=exposure level of "X"-colored film dye (represented by the associated output signal $R_{FM}$, $G_{FM}$ or $B_{FM}$)

$E_{xo}$=antilog$_{10}$\{0.8/ASA-Nx[0.1 +log$_{10}$(1−10$^{-0.1}$)]\}

$Ax$ = measure of asymmetry of toe ("toe character") of "X"-colored film dye's characteristic curve = |Dxd − Dxl| [default value: $Ax = -1$]

= log$_{10}$ (1 − 10$^{(Dxd-Dxl)}$)/(Dxd − Dxl)

Dxd="toe" density of "X"-colored film dye (see FIG. 5)

Dxl=minimum (base+fog) density of "X"-colored film dye*

Dx=density of "X"-colored film dye (represented by the associated input signal $R_{FME}$, $G_{FME}$ or $B_{FME}$)

$Bx$ = measure of asymmetry of shoulder ("shoulder character") of "X"-colored film dye's characteristic curve = |Dxu − Dxc| [default value: $Bx = 1$]

= log$_{10}$ (1 − 10$^{(Dxc-Dxu)}$)/(Dxc − Dxu)

Dxu=maximum (saturation) density of "X"-colored film dye*

Dxc="shoulder" density of "X"-colored film dye (see FIG. 5)

Nx≈1/γ

ASA=film speed*

*available from film manufacturer's data sheet.

The sensitometric conversion performed by converters 112R, 112G, 112B according to the foregoing formula uses film color correction parameters associated with film characteristics. These film color correction parameters include the minimum (i.e. base plus fog) Dxl and maximum (i.e. saturation) Dxu densities of the respective colored film dyes, the respective toe Ax and shoulder Bx characters of the film dyes' characteristic curves, gamma γ and the film speed ASA. These film color correction parameters are provided to each of the converters 112R, 112G, 112B by film parameter register 116 via separate signal interface lines 130R, 130G, 130B. Film parameter register 116 receives the film color correction parameters from an external source, e.g. a computer or keyboard input interface (not shown), via film parameter interface 128.

The corrected, sensitometrically converted film color signals $R_{FME}$, $G_{FME}$, $B_{FME}$ (corrected for film dye crosstalk effects and the nonlinear characteristics of exposed film dye densities) are then separately antilogarithmically converted, i.e. exponentiated, back to their linear equivalent signals $R_D$, $G_D$, $B_D$ by their respective antilogarithmic converters 114R, 114G, 114B. These signals $R_D$, $G_D$, $B_D$ are then available for color correction in accordance with video parameters within video parameter corrector 104 or encoding within encoder 106 (discussed more fully below).

Functionally, each of the sensitometric and antilogarithmic converter assemblies 117R, 117G, 117B comprises a sensitometric converter 112R, 112G, 112B and an antilogarithmic converter 114R, 114G, 114B. Each of the sensitometric converters 112R, 112G, 112B can comprise a LUT, wherein the respective input signals $R_{FM}$, $G_{FM}$, $B_{FM}$ address the contents thereof, which in turn, provide the respective converted signals $R_{FME}$, $G_{FME}$, $B_{FME}$. Similarly, each of the antilogarithmic converters 114R, 114G, 114B can comprise a LUT, wherein the respective input signals $R_{FME}$, $G_{FME}$, $B_{FME}$ address the contents thereof, which in turn, provide the respective linear equivalent signals $R_D$, $G_D$, $B_D$. However, in a preferred embodiment of each of the sensitometric and antilogarithmic converter assemblies 117R, 117G, 117B, the sensitometric and antilogarithmic conversions are functionally combined into a single LUT.

A preferred embodiment of the "red" sensitometric and antilogarithmic converter assembly 117R comprises two LUTs coupled for multiplexed operation. The color masked red film signal $R_{FM}$ is coupled to the inputs of both LUTs. Both LUTs are also coupled to the "red" converter interface 130R for selectively receiving further or updated film parameter data (as discussed above). Under synchronous control by controller 107 (discussed above), the LUTs alternate between (1) receiving the color masked red film signal $R_{FM}$ and outputting the corresponding converted red film signal $R_{FME}$, and (2) receiving further or updated film parameter data via the "red" converter interface 130R. This multiplexed operation allows circuit 117R to run faster than a single LUT circuit, where such single LUT would have to be time-shared between converting film signals and receiving more film parameter data.

It should be understood that other conversion means can be used instead of LUTs, as desired. For example, digital adders or multipliers, a microprocessor, a RISC, a custom DSP or VLSI, or a spline generator can be used as well.

As discussed in more detail below, video parameter corrector 104 (shown in FIG. 7B) comprises display masking matrix processor 118, separate auxiliary processors 120R, 120G, 120B, separate video standard converters 122R, 122G, 122B, and a display parameter register 124, all connected as shown in FIG. 7B. Display masking matrix processor 118 receives the corrected film color signals $R_D$, $G_D$, $B_D$ and provides corresponding output signals $R_{DM}$, $G_{DM}$, $B_{DM}$ which are received by the auxiliary processors 120R, 120G, 120B. Auxiliary processors 120R, 120G, 120B provide corresponding output signals $R_{DMA}$, $G_{DMA}$, $B_{DMA}$ which are received by video standard converters 122R, 122G, 122B. Video standard converters 122R, 122G, 122B provide corresponding output signals $R_s$, $G_s$, $B_s$ which are received by the input color signal ports of encoder 106 (discussed below).

The corrected film color signals $R_D$, $G_D$, $B_D$ are received by display masking matrix processor 118 from antilogarithmic converters 114R, 114G, 114B (within film parameter corrector 102, as discussed above) for color masking to compensate for crosstalk effects within the entire system (e.g. between the final display device, such as a cathode ray tube display (not shown), and a scanning device which generated original input signals $R_F$, $G_F$, and $B_F$, such as an image orthicon (not shown)). Display masking matrix processor 118 outputs these compensated signals as display masked signals $R_{DM}$, $G_{DM}$, $B_{DM}$. This masking provides for corrected video signal characteristics, such as hue, saturation and value, and is accomplished by modifying, e.g. scaling and mixing, the display color information contained within the respective corrected film color signals $R_D$, $G_D$, $B_D$. This display masking is performed substantially in accordance with the following formula:

$$\begin{bmatrix} R_{DM} \\ G_{DM} \\ B_{DM} \end{bmatrix} = \begin{bmatrix} D_{RR} & D_{RG} & D_{RB} \\ D_{GR} & D_{GG} & D_{GB} \\ D_{BR} & D_{BG} & D_{BB} \end{bmatrix} \begin{bmatrix} R_D \\ G_D \\ B_D \end{bmatrix} + \begin{bmatrix} C_{DR} \\ C_{DG} \\ C_{DB} \end{bmatrix}$$

where:

$R_{DM}$=masked Red display signal $G_{DM}$=masked Green display signal $B_{DM}$=masked Blue display signal $D_{XY}$=display masking matrix coefficients (for contribution to "X"-colored display signal by "Y"-colored film signal)

$C_{DX}$=display correction factors (for "X"-colored display signal)

Display masking matrix coefficients $D_{XY}$ and display correction factors $C_{DX}$ are provided to display masking matrix processor 118 by display parameter register 124 via signal interface 132. In turn, display parameter register 124 receives the coefficients $D_{XY}$ and factors $C_{DX}$ from an outside source, such as a computer or keyboard input interface (not shown) via display parameter interface 134. These coefficients $D_{XY}$ and factors $C_{DX}$ can be modified as desired by entering new values or adjusting the default values via a computer or keyboard interface (not shown) coupled to display parameter interface 134.

The display masking matrix coefficients $D_{XY}$ have default values which are determined by initially calibrating the system and computing their individual values. This initial calibration can be accomplished by inputting reference color information (e.g. scanning red, green and blue standard images) and measuring the system response thereto (e.g. measuring the respective responses to the scanned red, green and blue standard images). The display masking matrix coefficients $D_{XY}$ can be computed based upon data obtained from this initial calibration. Alternatively, if little or no masking is deemed necessary or desirable, the "diagonal" coefficients (i.e. $D_{RR}$, $D_{GG}$, $D_{BB}$) can each be given a value of unity and the "off diagonal" coefficients (i.e. $D_{RG}$, $D_{RB}$, $D_{GB}$, $D_{GR}$, $D_{BR}$, $D_{BG}$) can each be given a value of zero.

Display correction factors $C_{DX}$ represent fixed (e.g. dc) signal parameters and can be used to provide additional signal amplification or attenuation. However, typically these factors $C_{DX}$ will each be given a value of zero (i.e. unity in terms of original signal amplification or attenuation).

Display masking matrix processor 118 preferably comprises twelve registers, and a number of multipliers and adders, connected to operate according the foregoing formula. However, it should be understood that other masking means can be used, such as a microprocessor, RISC, or custom DSP or VLSI circuit.

Display masked signals $R_{DM}$, $G_{DM}$, $B_{DM}$ are then separately processed in auxiliary processors 120R, 120G, 120B. Auxiliary processors 120R, 120G, 120B allow each of display masked signals $R_{DM}$, $G_{DM}$, $B_{DM}$ to be "fine tuned" according to subjective color correction parameters provided to auxiliary processors 120R, 120G, 120B via separate signal interfaces 136R, 136G, 136B, from display parameter register 124 and display parameter interface 134.

This subjective color correction can be done substantially on a graphical point-by-point basis within each respective color space, i.e. within the color saturation range, for each of the display masked signals $R_{DM}$, $G_{DM}$, $B_{DM}$. Such subjective color correction is the subject of the above-mentioned commonly assigned, copending patent application Ser. No. 08/048,077, filed Apr. 14, 1993 (a continuation of U.S. Ser. No. 07/687,962, entitled "Digital Video Processing System With Gross and Fine Color Correction Modes," filed on Apr. 19, 1991), the specification of which is incorporated herein by reference.

To implement the present invention, each of processors 120R, 120G, and 120B can comprise a look-up table which performs the function of above-described LUT 12 of FIG. 6. Thus, luminance values L (indexed by video levels V) for performing film-like compression on "red" color component values $R_{DM}$ are loaded from a processor (not shown in FIGS. 7A and 7B, but programmed in the same manner as above-described processor 16 of FIG. 6) to register 124, and from register 124 via signal interface 136R to processor 120R. Similarly, luminance values L (indexed by video levels V) for performing film-like compression on "green" color component values $G_{DM}$ are loaded from such processor to register 124, and from register 124 via signal interface 136G to processor 120G, and luminance values L (indexed by video levels V) for performing film-like compression on "blue" color component values $B_{DM}$ are loaded from such processor to register 124, and from register 124 via signal interface 136B to processor 120B.

After being outputted from processors 120R, 120G, 120B, processed video color signals $R_{DMA}$, $G_{DMA}$, $B_{DMA}$ (which may have undergone film-like compression in accordance with the invention in processors 120R, 120G, and 120B) are then separately converted according to selected video color standards within their respective video standard converters 122R, 122G, 122B. Such video color standard conversion is a form of video color signal pre-emphasis, e.g. signal amplitude scaling, which is required to ensure that the resulting video color signals $R_s$, $G_s$, $B_s$ conform to the applicable display standard. This conversion can be done according to any video or television color standard (e.g. NTSC, PAL or SECAM), as desired.

Each of video standard converters 122R, 122G, 122B comprises a LUT, wherein the input signals $R_{DMA}$, $G_{DMA}$, $B_{DMA}$ address the contents thereof, which in turn, provide the video standard signals $R_s$, $G_s$, $B_s$. However, it should be understood that other conversion means can be used, as desired, such as digital adders or multipliers, a microprocessor, a RISC, a custom DSP or VLSI, or a spline generator. Further, these video standard converters 122R, 122G, 122B can alternatively be selectively provided with control signals and parametric signals via signal interfaces 138R, 138G, 138B, the display parameter register 124 and display parameter interface 134, as desired.

The standardized video color signals $R_s$, $G_s$, $B_s$ are inputted into input color signal ports of encoder 106 for selective encoding of the color correction parameters. As discussed further below, the encoder 106 provides the capability of selectively encoding the color correction parameters discussed above within the individual output color signals R, G, B. In other words, the encoder 106 can selectively encode separate data representing the aforementioned color correction parameters into the individual output color signals R, G, B.

Therefore, rather than merely outputting only corrected color signals, either corrected or uncorrected color signals can be selectively outputted along with their respective color correction parameter data. This can be an appealing feature when it is desired to have both the color signals, either corrected or uncorrected, and their respective appropriate color correction parameters available (e.g. for display or transference back to film). Otherwise, if the color signals are provided only in their color corrected form, information regarding their initial uncorrected form is lost.

Encoder 106 receives at its parameter signal ports the film color correction parameters from film parameter register 116 via film color correction parameter interface 140. Encoder 106 also receives at its parameter signal ports the display color correction parameters from display parameter register 124 via display color correction parameter interface 142. Further, encoder 106 selectively receives at its color signal input ports the fully corrected, standardized video color signals $R_s$, $G_s$, $B_s$ from the video standard converters 122R, 122G, 122B (within the video parameter corrector 104, as discussed above); or alternatively, encoder 106 selectively receives at its color signal input ports the initial, uncorrected input film color signals $R_F$, $G_F$, $B_F$ via direct connections 144R, 144G, 144B bypassing film parameter corrector 102 and video parameter corrector 104; or further alternatively, encoder 106 selectively receives at its color signal input ports the partially corrected film color signals $R_D$, $G_D$, $B_D$ via direct connections 146R, 146G, 146B bypassing video parameter corrector 104.

The encoding performed by encoder 106 can be accomplished by implementing any of the many encoding techniques known in the art. For example, the respective color correction parameter data can be inserted (e.g. summed) into a portion of the output color signals R, G, B (e.g. into vertical intervals thereof).

This encoding of the color correction parameters can also be done in the same manner as is the encoding of field or frame marking data disclosed in commonly assigned, copending patent application U.S. Ser. No. 07/883,888, filed May 12, 1992 (a file-wrapper continuation of U.S. Ser. No. 07/699,928, entitled "Film-to-Video Frame Image Conversion Apparatus and Method for Selectively Identifying Video Fields and Frames," filed May 14, 1991), the specification of which is incorporated herein by reference.

The signal color correction and color correction parameter data encoding, discussed above, can be selectively done on any basis. For example, color correction or encoding can be done on a frame-by-frame or scene-by-scene basis, as desired. Furthermore, if desired, this color correction or encoding can be done on a field-by-field basis to modify or encode data into individual video fields. This flexibility, due in no small part to digital implementation of the invention, facilitates many editing operations, such as dissolving, fading and scene-to-scene (or even field-to-field or frame-to-frame) color matching.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for performing film-like compression on a video signal, including the steps of:

(a) supplying the video signal to a compression means; and (b) performing film-like compression on the video signal in the compression means in accordance with a film-like compression function, thereby generating a compressed video signal from the video signal, wherein the video signal comprises pixels having relative scene luminance values L, the compressed video signal comprises modified pixels having video levels V, and the film-like compression function is the inverse of:

$$L = \left[ \frac{1}{1 - \left( \frac{V+V_s}{V_{max}} \right)^\beta} \right]^m V^n$$

where "m" is a parameter, "$V_s$" is an offset parameter "$V_{max}$" is a maximum video level parameter, "n" is a parameter equal to the inverse of a gamma parameter, and "β" is a shoulder curvature parameter.

2. The method of claim 1, wherein m=n.

3. The method of claim 1, wherein the video signal is generated by a video camera, and the compression means is installed in said video camera.

4. The method of claim 1, wherein the video signal is an analog video signal.

5. A method for performing film-like compression on a video signal, including the steps of:

(a) supplying the video signal to a compression means; and (b) performing film-like compression on the video signal in the compression means in accordance with a film-like compression function, thereby generating a compressed video signal from the video signal, wherein the video signal comprises pixels having relative scene luminance values L, the compressed video signal comprises modified pixels having video levels V, and the film-like compression function is the inverse of:

$$L = \left[ \frac{1}{1 - \left( \frac{V+V_s}{V_{max}} \right)^\beta} \right] V^n$$

where "$V_s$" is an offset parameter, "$V_{max}$" is a maximum video level parameter, "n" is a parameter equal to the inverse of a gamma parameter, and "β" is a shoulder curvature parameter.

6. A method for performing film-like compression on a video signal, including the steps of:

(a) supplying the video signal to a compression means; and (b) performing film-like compression on the video signal in the compression means in accordance with a film-like compression function, thereby generating a compressed video signal from the video signal, wherein the video signal is a digital signal comprising a stream of pixels having relative scene luminance values L, wherein the compressed video signal comprises modified pixels having video levels V, and wherein step (b) includes the step of:

(c) loading a look-up table with look-up table values defining said video levels V, in a manner so that the look-up table values are indexed by the relative scene luminance values L.

7. The method of claim 6, wherein the film-like compression function is the inverse of L=F(V), wherein step (c) includes the steps of:

determining an intermediate look-up table representing L=F(V);

using the intermediate look-up table to determine bracketing indices $V_{lower}$ and $V_{upper}$ for each input luminance L, such that $F(V_{lower}) < L < F(V_{upper})$; and determining an output video level V corresponding to said each input luminance L, wherein said output video level V is the same fractional distance between the bracketing indices $V_{lower}$ and $V_{upper}$ as is the corresponding input luminance L between $F(V_{lower}) < L < F(V_{upper})$.

8. A system for performing film-like compression on a video signal, including:

means for performing film-like compression on the video signal in accordance with a film-like compression function, thereby generating a compressed video signal from the video signal, wherein the film-like compression function has a set of transformation parameters; and means for supplying a selected set of values for the set of transformation parameters to the means for performing film-like compression, wherein the video signal comprises pixels having relative scene luminance values L, the compressed video signal comprises modified pixels having video levels V, and the film-like compression function is the inverse of:

$$L = \left[ \frac{1}{1 - \left( \frac{V+V_s}{V_{max}} \right)^\beta} \right]^m V^n$$

where "$V_s$" is an offset parameter, "$V_{max}$" is a maximum video level parameter, "n" is a parameter equal to the inverse of a gamma parameter, "β" is a shoulder curvature parameter, and "m" is another parameter.

9. The system of claim 8, wherein m=n.

10. The system of claim 8, wherein said system is a video post-production editing system, wherein the video signal has a first dynamic range and a reference video segment has a second dynamic range, and wherein said selected set of values for the set of transformation parameters is selected so that the compressed video signal has a modified dynamic range substantially equal to said second dynamic range.

11. The system of claim 8, wherein the video signal is an analog video signal, and wherein the means for performing film-like compression includes:

analog circuitry for performing said film-like compression on said analog video signal in accordance with said film-like compression function.

12. A system for performing film-like compression on a video signal, including:

means for performing film-like compression on the video signal in accordance with a film-like compression function, thereby generating a compressed video signal from the video signal, wherein the film-like compression function has a set of transformation parameters; and means for supplying a selected set of values for the set of transformation parameters to the means for performing film-like compression, wherein the video signal comprises pixels having relative scene luminance values L, the compressed video signal comprises modified pixels having video levels V, and the film-like compression function is the inverse of:

$$L = \left[ \frac{1}{1 - \left( \frac{V + V_s}{V_{max}} \right)^\beta} \right]^n V^n$$

where "$V_s$" is an offset parameter, "$V_{max}$" is a maximum video level parameter, "n" is a parameter equal to the inverse of a gamma parameter, and "$\beta$" is a shoulder curvature parameter.

13. The system of claim 12, wherein the video signal is an analog video signal, and wherein the means for performing film-like compression includes:

analog circuitry for performing said film-like compression on said analog video signal in accordance with said film-like compression function.

14. A video camera for generating a compressed video signal having film-like compression characteristics, including:

means for generating a raw video signal;

means for performing film-like compression on the raw video signal in accordance with a film-like compression function, thereby generating the compressed video signal from the raw video signal, wherein the film-like compression function has a set of transformation parameters; and means for supplying a selected set of values for the set of transformation parameters to the means for performing film-like compression, said means for supplying a selected set of values including controls that are mechanically actuatable by a user.

15. The video camera of claim 14, wherein each of the compressed video signal and the raw video signal is an analog signal, and wherein the means for performing film-like compression includes:

analog-to-digital conversion means for converting the raw video signal to a stream of digitized pixels;

look-up table means for converting the digitized pixels into film-like compressed pixels; and digital-to-analog conversion means for converting the film-like compressed pixels into said compressed video signal.

16. A system for performing film-like compression on a video signal, including:

means for performing film-like compression on the video signal in accordance with a film-like compression function, thereby generating a compressed video signal from the video signal, wherein the film-like compression function has a set of transformation parameters; and means for supplying a selected set of values for the set of transformation parameters to the means for performing film-like compression, wherein the video signal is a digital signal comprising a stream of pixels having relative scene luminance values L, wherein the compressed video signal comprises modified pixels having video levels V, and wherein the means for performing film-like compression includes:

a look-up table storing look-up table values defining the video levels V, said look-up table values being indexed by the relative scene luminance values L.

17. The system of claim 16, wherein the film-like compression function is the inverse of L=F(V), and also including a processor programmed with software for:

determining an intermediate look-up table representing L=F(V);

using the intermediate look-up table to determine bracketing indices $V_{lower}$ and $V_{upper}$ for each input luminance L, such that $F(V_{lower}) < L < F(V_{upper})$; and determining an output video level V corresponding to said each input luminance L, wherein said output video level V is the same fractional distance between the bracketing indices $V_{lower}$ and $V_{upper}$ as is the corresponding input luminance L between $F(V_{lower}) < L < F(V_{upper})$.

18. A video camera for generating a compressed video signal having film-like compression characteristics, including:

means for generating a raw video signal; means for performing film-like compression on the raw video signal in accordance with a film-like compression function, thereby generating the compressed video signal from the raw video signal, wherein the film-like compression function has a set of transformation parameters; and means for supplying a selected set of values for the set of transformation parameters to the means for performing film-like compression, wherein the raw video signal comprises pixels having relative scene luminance values L, the compressed video signal comprises modified pixels having video levels V, and the film-like compression function is the inverse of:

$$L = \left[ \frac{1}{1 - \left( \frac{V + V_s}{V_{max}} \right)^\beta} \right]^m V^n$$

where "$V_s$" is an offset parameter, "$V_{max}$" is a maximum video level parameter, "n" is a parameter equal to the inverse of gamma, "$\beta$" is a shoulder curvature parameter, and "m" is another parameter.

19. The video camera of claim 18, wherein n=m.

20. The video camera of claim 18, wherein m=1.

* * * * *